United States Patent Office 3,379,545
Patented Apr. 23, 1968

3,379,545
HIGH STRENGTH GYPSUM PLASTER
John D. Shull, Jr., Tonawanda, N.Y., assignor to National Gypsum Company, Buffalo, N.Y., a corporation of Delaware
No Drawing. Filed Mar. 30, 1964, Ser. No. 355,953
10 Claims. (Cl. 106—110)

ABSTRACT OF THE DISCLOSURE

A gypsum plaster capable of providing compressive strengths in excess of 2,000 pounds per square inch within four hours after having been mixed with water and 4,000 pounds per square inch after drying consisting essentially of the following components in proper proportions: sand, a first atmospheric calcined gypsum hemihydrate having a particle size of between 3,000 and 7,000 square centimeters per gram, such as gauging plaster, board plant stucco, or moulding plaster, and a second atmospheric calcined gypsum hemihydrate having a particle size of between 8,000 and 16,000 square centimeters per gram, such as tube mill stucco.

---

The present invention relates to an improved gypsum plaster having an exceptionally high compressive strength.

Gypsum plasters made with ordinary atmospheric calcined gypsum generally do not have a compressive strength in excess of 3000 pounds per square inch. In the past, attempts have been made to increase the compressive strengths of gypsum plasters. Such attempts have required the use of processes which have increased the price of the resulting product excessively. These processes included steam pressure calcination and brine calcination, both of which required specialized equipment which are not used for the manufacture of conventional calcined gypsums used for conventional construction purposes. Thus the previous types of high compressive strength gypsum plasters which were made by the above described processes were limited for specialty purposes which could absorb the high cost of manufacture thereof. The use of such high strength gypsum plasters for conventional constructional purposes was prohibitively expensive.

It is accordingly the primary object of the present invention to provide an improved gypsum plaster having an especially high compressive strength which can be formulated in an extremely simple manner by merely mixing commercially available atmospheric calcined gypsums which are conventionally used for constructional purposes.

Another object of the present invention is to provide a gypsum plaster having a sufficiently high compressive strength so that it may be utilized for such interior uses as floors, columns, and beams, in addition to its conventional uses on walls and ceilings. A related object of the present invention is to provide an improved gypsum plaster of the foregoing type which weighs less than other materials conventionally used for floors, columns, and beams, and therefore reduces the dead-loading, which in turn reduces the metal requirements of structural steel framework.

A further object of the present invention is to provide an improved gypsum plaster which can attain a sufficiently high compressive strength within a relatively short period of time after it has been poured to permit the gypsum plaster to become load bearing without waiting for relatively long periods for it to set or cure.

A still further object of the present invention is to provide an improved gypsum plaster which not only has an exceptionally high compressive strength to thereby permit it to be used for load bearing purposes but which also has a relatively high fire resistance when compared to materials which are conventionally used as load bearing members.

Another object of the present invention is to provide an improved gypsum plaster which not only has an exceptionally high compressive strength but which also has excellent working properties and can also be troweled to a relatively smooth finish. Other objects and attendant advantages of the present invention will readily be perceived hereafter.

Briefly the improved gypsum plaster of the present invention consists essentially of a mixture of the hemihydrate of gypsum having a particle size of between 3,000 and 7,000 square centimeters per gram, the hemihydrate of gypsum having a particle size of between 8,000 and 16,000 square centimeters per gram, and sand, mixed in suitable proportions as will become more apparent hereafter. The range of gypsum to sand is between two and seven parts of mixed gypsum components to one part of sand, and the range of the two gypsum components is between three to one and one to three. The above particle sizes are determined by the well-known air permeability method of measurment. The hemihydrate of gypsum having a particle size of 3000 to 7000 square centimeters per gram which forms a first component of the mixture is preferably gauging plaster, which is conventionally used in the building trade. Other conventional hemihydrates of gypsum which also fall within the above range of sizes and can also be used as the first component of the mixture are board plant stucco and moulding plaster. The hemihydrate of gypsum having a particle size of between 8000 and 16,000 square centimeters per gram which forms a second component of the above mixture is preferably tube mill stucco which is in essence a material which was originally ground before calcination and then reground in a tube mill after calcination. Other types of hemihydrate of gypsum other than tube mill stucco but having the foregoing porticle size may also be used. The above hemihydrates which form both the first and second components of the mixture are calcined under normal atmospheric conditions. A sand which has been found suitable to form the third component of the above mixture is Wedron 4020 sand. Each of the foregoing gypsum components is a commercially available conventional material manufactured at any gypsum plaster mill. The foregoing materials are merely mixed in proper proportions to provide a resulting mixture, which after having been mixed with a suitable amount of water, may merely be poured into position without further processing to produce structures having especially high compressive strengths.

It is believed that the exceptionally high compressive strengths obtainable from the improved gypsum plaster of the present invention are due to the size gradations of the components. In other words, the components having the above size gradations combine in such a manner as to produce a plaster having an unusually high compressive strength.

Within four hours after pouring, and while still wet, the improved gypsum plaster of the present invention will provide compressive strengths of approximately 2,000 pounds per square inch, this being of sufficient magnitude to cause the plaster to be load bearing. After the gypsum plaster has completely set, compressive strengths in excess of 4,000 pounds per square inch and approaching 5,000 pounds per square inch have been obtained. Thus, because the gypsum plaster becomes load bearing almost immediately, curing times are not a source of construction delays. Furthermore, because of the high compressive strengths which are obtainable with the instant gypsum plaster, it may be used for beams, floors, and columns, which are subjected to high compressive forces, in addition to being used for conventional gypsum plaster purposes such as on walls and ceilings. In the foregoing respect it is to be noted that the plaster has excellent working properties and can be troweled to a relatively smooth finish.

Examples of suitable mixtures of the above enumerated components which have produced exceptionally high compressive strengths are set forth hereafter.

Example 1

A gypsum plaster made from two parts total of gypsum components by weight and one part 4020 Wedron sand by weight with the gypsum components consisting of 25% of tube mill stucco and 75% of gauging plaster when mixed with 30 pounds of water per 100 pounds of total dry components provided a compressive strength of 4150 pounds per square inch after complete drying.

Exmple 2

A gypsum plaster as set forth in Example 1 except with the gypsum components consisting of 50% tube mill stucco and 50% gauging plaster and mixed with 29 pounds of water per 100 pounds of total mixture provided a compressive strength of approximately 4366 pounds per square inch after complete drying.

Example 3

A gypsum plaster according to Example 1 but with the percentages of tube mill stucco and gauging plaster being 75% and 25%, respectively, and when mixed with 30 pounds of water per 100 pounds of dry mixture provided a compressive strength of 3950 pounds per square inch after complete drying.

Example 4

A gypsum plaster consisting of three parts gypsum and one part Wedron 4020 sand with the gypsum consisting in turn of 50% tube mill stucco and 50% gauging plaster after mixing with 30 lbs. of water per total dry weight of gypsum and sand provided a compressive strength of 4433 pounds per square inch after complete drying.

Example 5

A gypsum plaster consisting of four parts gypsum by weight and one part Wedron 4020 sand by weight with the gypsum in turn consisting of 50% tube mill stucco and 50% gauging plaster when mixed with 32 pounds of water per 100 pounds of dry mixture provided a compressive strength of 4675 pounds per square inch after complete drying.

Example 6

A gypsum plaster consisting of 5 parts gypsum by weight and one part sand by weight with the gypsum consisting of 50% of tube mill stucco and 50% of gauging plaster when mixed with 33.5 pounds of water per 100 pounds of dry components provided a compressive strength of 4500 pounds per square inch after complete drying.

Example 7

A gypsum plaster consisting of 6 parts of gypsum by weight and one part sand by weight with the gypsum consisting of 50% tube mill stucco and 50% of gauging plaster when mixed with 35 pounds of water per 100 pounds of total dry constituents provided a compressive strength of 4262 pounds per square inch after complete drying.

Example 8

A gypsum plaster having a ratio of 4 parts gypsum to one part Wedron 4020 sand by weight wherein the gypsum content was 25% tube mill stucco and 75% gauging plaster when mixed with 34.5 pounds of water per 100 pounds of total dry mixture gave a compressive strength of 4342 pounds per square inch after it was dried.

Example 9

A gypsum plaster having a ratio of 4 parts gypsum to one part Wedron 4020 sand by weight wherein the gypsum content was 75% tube mill stucco and 25% gauging plaster when mixed with 34 pounds of water per 100 pounds of total dry mixture gave a compressive strength of 4492 pounds per square inch after it was dried.

Example 10

A gypsum plaster having a ratio of 6 parts gypsum to one part Wedron 4020 sand by weight wherein the gypsum content was 25% tube mill stucco and 75% gauging plaster when mixed with 37 pounds of water per 100 pounds of total dry mixture gave a compressive strength of 4392 pounds per square inch after it was dried.

Example 11

A gypsum plaster having a ratio of 6 parts gypsum to one part Wedron 4020 sand by weight wherein the gypsum content was 75% tube mill stucco and 25% gauging plaster when mixed with 37 pounds of water per 100 pounds of total dry mixture gave a compressive strength of 4067 pounds per square inch after it was dried.

Examples 12–16

A gypsum plaster having a ratio of 4 parts total gypsum by weight and 1 part sand by weight wherein the gypsum content was 50% tube mill stucco and 50% gauging plaster gave the following compressive strengths with each of the following sands after the mixture completely dried:

(12) Wedron 4098–4542 p.s.i. when mixed in the proportion of 32 lbs. of water per 100 lbs. of dry mixture.

(13) Wedron 4020–4783 p.s.i. when mixed with 32 lbs. of water per 100 lbs. of dry components.

(14) Wedron 5010–4625 p.s.i. when mixed with 32 lbs. of water per 100 lbs. of dry constituents.

(15) Wedron 7010–4267 p.s.i. when mixed with 33 lbs. of water per 100 lbs. of dry constituents.

(16) 100M–4237 p.s.i. when mixed with 35 lbs. of water per 100 lbs. of dry constituents.

From the foregoing it can be seen that Wedron 4020 sand gave the highest strength in the above described compositions. However, all of the sands tested caused the resulting plaster to have compressive strengths in excess of 4000 pounds per square inch.

Example 17

A gypsum plaster having a ratio of two parts gypsum by weight to one part sand by weight wherein the gypsum consisted of equal amounts of heavy aridized tube mill stucco and gauging plaster produced a compressive strength when completely dried of 4700 pounds per square inch.

Example 18

A gypsum plaster having a ratio of two parts of gypsum by weight to one part of sand by weight wherein the gypsum consisted of equal parts of tube mill stucco and board plant stucco produced a compressive strength when completely dried of 4429 pounds per square inch, said components having been mixed with 27½ pounds of water per 100 pounds of dry mixture.

Example 19

A gypsum plaster having a ratio of two parts of gypsum by weight to one part sand by weight wherein the gypsum consisted of 50% of gauging plaster and 50% of tube mill-imp mill stucco produced a compressive strength when completely dried of 4575 pounds per square inch, said resulting plaster having been formulated with 28.5 pounds of water per 100 pounds of dry components.

Example 20

A gypsum plaster having a ratio of seven parts of gypsum by weight to one part of Wedron 4020 sand by weight wherein the gypsum consisted of 50% of gauging plaster and 50% of tube mill stucco produced a compressive strength when completely dried of 4300 pounds per square inch, said resulting plaster having been formulated with 37 pounds of water per 100 pounds of dry mixture.

Example 21

A gypsum plaster having a ratio of seven parts of gypsum by weight to one part of Wedron 4020 sand by weight wherein the gypsum consisted of 75% of tube mill stucco and 25% of gauging plaster produced a compressive strength when completely dried of 4375 pounds per square inch, said resulting plaster having been formulated with 37.5 pounds of water per 100 pounds of dry components.

Example 22

A gypsum plaster having a ratio of seven parts of gypsum by weight to one part of Wedron 4020 sand by weight wherein the gypsum consisted of 75% of gauging plaster and 25% of tube mill stucco produced a compressive strength when dried of 4400 pounds per square inch, said resulting plaster having been formulated with 37.5 pounds of water per 100 pounds of dry components.

All of the foregoing mixtures were capable of providing a compressive strength in excess of 2000 pounds per square inch four hours after having been poured.

The foregoing heretofore unobtainable high compressive strengths are entirely unexpected in that they would not normally and logically flow from prior teachings. More specifically, the normally obtainable compressive strength of a mixture of 50% hemihydrate of gypsum, either gauging plaster *or* tube mill stucco and 50% sand does not exceed 3,000 p.s.i. Therefore in going to the above enumerated compositions wherein there are at least two parts gypsum by weight to one part sand, it would have been expected that the compressive strengths obtainable would have been the same as those obtainable from 1:1 mixtures of gypsum and sand because of the action of compensating factors, namely, that the possible increase in strength of the resulting product due to the greater gypsum content would be negated by the actual decrease in strength due to the increased water requirement stemming from the increase in gypsum content. Thus the teachings of past gypsum technology would have provided no indication that the high compressive strengths of the instant compositions could have been obtained.

It will be appreciated, of course, that additives such as dispersing agents like lignosulfonates may be used to decrease the water requirements of the mixtures, and, further, other types of additives, which are well known in the art, may be in certain situations added to provide other desired characteristics.

Summarizing therefore, it can readily be seen that the instant gypsum plaster has numerous advantages over conventional gypsum plasters used in the past. Firstly, since it attains a compressive strength of at least 2000 pounds per square inch four hours after pouring, it becomes load bearing after such time and therefore permits subsequent steps required in construction to be performed almost immediately after pouring, for all practical purposes. Secondly, the gypsum plaster of the present invention has a high fire resistance which is in fact higher than conventional poured materials ordinarily utilized to carry compressive loads. Thirdly, since the gypsum plaster of the present invention is relatively light, its use provides a relatively low dead-load on structural members and therefore in turn requires a relatively low weight of structural steel to support it. Fourthly, since the high compressive strength gypsum plaster of the present invention is formulated by merely mixing conventional readily available products without the requirement for additional chemical, physical or thermal actions, the resulting plaster is relatively economical. In short the improved high strength gypsum plaster of the present invention has a plurality of features which may render it highly desirable for construction purposes.

Since there are many methods used in the gypsum industry for determining the particle size of ground gypsum and since the results obtained from all of these methods are not uniform, it is to be again noted that the particle sizes of the hemihydrate of gypsum referred to in the specification and in the claims have been obtained by the air permeability method of measurement.

What is claimed is:

1. A gypsum composition consisting essentially of sand in admixture with mixed gypsum components, wherein said sand is present in a weight ratio of one part of sand for every two to seven parts of said mixed gypsum components, and wherein said mixed gypsum components include a first hemihydrate of gypsum component which has been calcined under atmospheric pressure and has a particle size by the air permeability method of between 3,000 and 7,000 square centimeters per gram and a second hemihydrate of gypsum component which has been calcined under atmospheric pressure and then subsequently tube milled and has a particle size by the air permeability method of between 8,000 and 16,000 square centimeters per gram, the weight ratio of said first gypsum component to said second gypsum component being in the range of 3:1 to 1:3, said composition providing a compressive strength in excess of about 4,000 pounds per square inch after said composition has been mixed with water and permitted to set.

2. A building component comprising the set dried composition resulting from the admixture of the composition of claim 1 and water.

3. A composition in accordance with claim 1 wherein the sand is present in a weight ratio of approximately one part of sand for every four parts of said mixed gypsum components.

4. A composition as set forth in claim 3 wherein said first and second gypsum components are present in equal amounts.

5. A composition in accordance with claim 1 wherein said first gypsum component is gauging plaster.

6. A composition in accordance with claim 1 wherein said first gypsum component is moulding plaster.

7. A composition in accordance with claim 1 wherein said first gypsum component is board plant stucco.

8. A composition in accordance with claim 1 wherein said second gypsum component is tube milled stucco prepared by grinding, calcining and then regrinding.

9. A composition in accordance with claim 1 wherein the weight ratio of said first gypsum component to said second gypsum component is substantially 1:1.

10. A composition in accordance with claim 1 wherein the weight ratio of said first gypsum component to said second gypsum component to said sand is 1:1:1.

References Cited

UNITED STATES PATENTS

| | | | |
|---|---|---|---|
| 1,999,158 | 4/1935 | Roos | 106—110 |
| 2,341,426 | 2/1944 | Dailey | 106—110 |
| 2,820,714 | 1/1958 | Schneiter et al. | 106—110 |
| 2,913,308 | 11/1959 | Dailey et al. | 106—110 |
| 2,947,643 | 8/1960 | Kamlet | 106—109 |
| 2,980,548 | 4/1961 | Hampton | 106—118 |
| 3,042,537 | 7/1962 | Newell | 106—110 |

TOBIAS E. LEVOW, *Primary Examiner.*

S. E. MOTT, *Assistant Examiner.*